June 26, 1962 L. W. IMM 3,040,587

INTEGRATING MECHANISM

Original Filed Nov. 9, 1945 2 Sheets-Sheet 1

INVENTOR.
LEWIS W. IMM
BY
Naylor and Lassagne
ATTORNEYS

June 26, 1962 L. W. IMM 3,040,587

INTEGRATING MECHANISM

Original Filed Nov. 9, 1945 2 Sheets-Sheet 2

INVENTOR.
LEWIS W. IMM
BY
Naylor and Lassagne
ATTORNEYS

3,040,587
INTEGRATING MECHANISM

Lewis W. Imm, Pacoima, Calif., assignor to General Precision, Inc., a corporation of Delaware Original application Nov. 9, 1945, Ser. No. 627,587, now Patent No. 2,916,208, dated Dec. 8, 1959. Divided and this application Jan. 6, 1949, Ser. No. 69,443
8 Claims. (Cl. 74—1)

The present invention relates to computing devices and, more particularly, to a computer comprising a combination of integrators in a novel relationship which makes possible the solution, by simple means of a variety of types of problems involving principal trigonometric functions of angles. In the conversion of polar coordinates, whether fixed or variable, because of a rotation of axes without change of origin, to corresponding rectangular coordinates, for example, it is possible to multiply the known vector value by the sine and cosine values, respectively, of the known locating angle, using the instantaneous value of the locating angle when the polar coordinates are variable or shifting. The conversion of coordinates without the aid of computing devices is most readily accomplished by this type of computation, and it is therefore natural that designers of computing devices have heretofore adhered to this conventional type of computation in designing automatic coordinate converters; the tendency being to construct a mechanism capable of carrying out, either mechanically or electrically, the same steps previously followed in pad-and-pencil calculation.

It is also possible to solve the same problem of converting polar coordinates, whether fixed or variable, to rectangular coordinates by integral calculus; in the case of fixed coordinates, by treating the value of the locating angle as the change of said angle between the lower limit of zero and the upper limit corresponding to the value of the angle, and, in the case of variable or shifting coordinates, by using the difference between the former and present values of the locating angle as the change of the angle. However, the formal manual computation of the solution of the problem in such a manner is complex in comparison with the aforedescribed method of manual computation, and it has heretofore been assumed that any computer designed to solve such a problem the "calculus way" would be correspondingly more complicated than one designed to solve the problem in the way customarily employed in longhand calculation.

The present invention is based upon my discovery that by combining either mechanical or electrical integrating devices in a certain relationship with each other, this and related problems involving angular functions can be solved by the method of integral calculus, with attendant advantages not possessed by other computers designed for the same general purpose, and without the introduction of any countervailing structural complexity.

The principal object of the invention is to provide a simple and efficient computer for applying the methods of integral calculus to the solution of problems involving angular functions.

Further important objects of the invention are to enhance the accuracy and expand the range of computers of the character to which the invention is applied.

Other objects and advantages of the invention will be apparent from the following description taken in conjunction with the drawings forming part of this specification, and in which.

Figure 1:
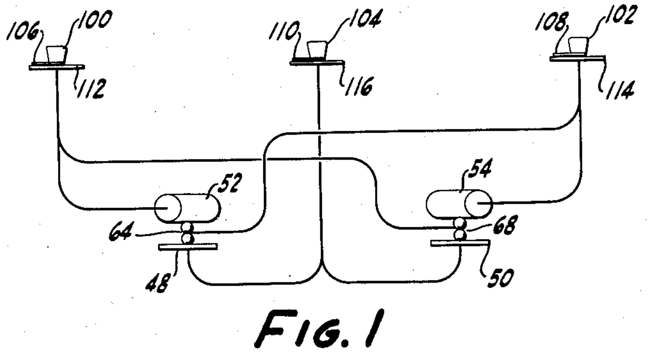
FIGURE 1 is a schematic diagram of the computer embodied in the invention.

Broadly, the computer is comprised of a pair of integrators which are preferably of the type having a cylinder, a disc, and a ball-carrier therebetween. First and second input means are each connected to one of the ball carriers and to the cylinder associated with the other ball carrier, and a third input means is provided to rotate the discs. Upon the rotation of the discs, the integrated functions of the input values, in accordance with which the ball carriers are initially positioned, are fed back to the first and second inputs in such manner that the integrated function of the input value entered by the first input means is added to the value initially entered by the second input means and the integrated function of the input value entered by the second input means is added to the value initially entered by the first input means; this action proceeding progressively as the initially entered values are changed by such operation.

Where the input values of the first and second input means are vector-cosine and vector-sine relationships, respectively, as, for example, when the initially entered input values are rectangular coordinates corresponding to a polar coordinate vector and angle relation, the computer is particularly suited to solve for a new set of rectangular coordinates corresponding to a variation in the locating angle of the polar coordinates, since each of the input values is equal to the derivative of the other input value, and an integration of each input value results in the addition of each integrated value to an input value of the same units. For example, where the initial values of the first and second input means are, as above stated, vector-cosine and vector-sine relationships, the integraton of the vector-cosne input is fed to the second input as a vector-sine relationship, the same kind of function fed into the second input, and the integration of the vector-sine input is fed to the first input as a vector-cosine relationship, the same kind of function initially fed into said input.

Referring to the drawings for further details of the invention, 10, 12, 14 and 16 are spaced, interconnected support elements having bushings 18 of bearing material for the rotational support of shafts 20, 22, 24, 26 and 28. Element 12 supports substantially U-shaped brackets 30 and 32 having sleeve extensions 34 and 36 extending through said element and serving as bearing supports for the hubs of gears 38 and 40 which are in mesh with each other and respectively secured to shafts 28 and 42. The brackets 30 and 32 in turn form the support members for integrators indicated generally by 44 and 46 and comprising discs 48 and 50 secured respectively to shafts 28 and 42, rotatable cylinders 52 and 54, and ball carriers 56 and 58 mounted on spaced racks 60 and 62 journalled for sliding movement in the brackets 30 and 32. Ball carrier 56 supports a pair of contacting balls 64, the upper one of which is in engagement with the disc 48 and the lower one of which is in engagement with the cylinder 52, and is shown as freely mounted on rack 62 but secured to rack 60, as by a set screw 66, while ball carrier 58, provided with a pair of contacting balls 68 in engagement with the disc 50 and cylinder 54, is shown as freely mounted on rack 60 but secured to rack 62, as by a set screw 70.

Cylinders 52 and 54 have secured thereto rotatable shafts 72 and 74, respectively, which are provided at their ends with bevel gears 76 and 78 in mesh with bevel gears 80 and 82 secured to shafts 24 and 26 for rotation therewith. Shaft 24 has also secured thereto for rotation therewith gears 84 and 86, the former being in mesh with a gear 88 secured to shaft 20 and the latter being in mesh with teeth 90 of rack 62. Shaft 26 has secured thereto gears 92 and 94 in mesh, respectively, with a gear 96 secured to shaft 22 and with teeth 98 of rack 60.

Shafts 20, 22 and 28 are provided with means for entering values into the computer and for receiving values therefrom which are shown as comprising knobs 100, 102 and 104 fixed, respectively, to shafts 20, 22 and 28 and carrying indicators 106, 108 and 110; but it will be understood that when the computer of the present invention is employed as a part of a complex computer, other means, such as outputs of other parts of the complex computer, may be connected to rotate these shafts. Fixed dials 112, 114 and 116 may be associated, respectively, with the indicators 106, 108 and 110, dials 112 and 114 being provided with marginal indicia denoting, for example, units of linear measure and dial 116 being provided with indicia denoting, for example, units of circular degrees.

Figure 5:
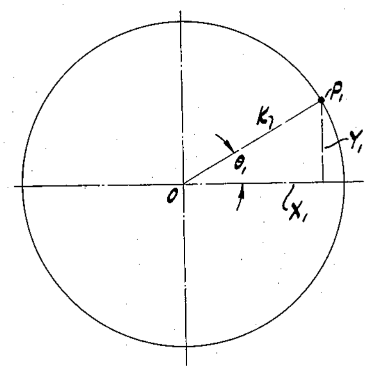
FIGURES 5 to 7 are geometrical views useful in explaining the types of problems which may be solved by the use of the computer.
Figure 6:
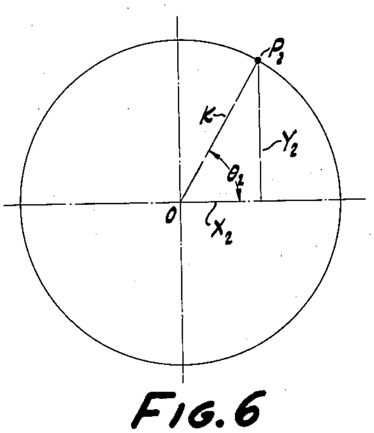
Figure 7:
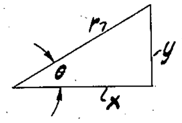

The computer above-described is particularly adapted for solving problems of the type diagrammatically shown in FIGURES 5–7. Referring to FIGURE 5, there is shown a circle having its center O as the point of origin for a point $P_1$, said point having (K, $\theta_1$) as its polar coordinates and ($X_1$, $Y_1$) as its rectangular coordinates. For this particular problem, the values of K, $X_1$ and $Y_1$ are known. It is further known that K will shift, while maintaining O as the point of origin, to locate, for example, point $P_2$ (FIGURE 6) having the polar coordinates (K, $\theta_2$) and the rectangular coordinates ($X_2$, $Y_2$), as shown in FIGURE 6, and it is desired that the values of $X_2$ and $Y_2$ be obtained directly from the values of $X_1$ and $Y_1$ and the known, or readily measured, change in $\theta$, or $\theta_2-\theta_1$.

The computer is monitored to the problem set forth by manually rotating the knob 100 in the proper direction in relation to dial 112 a distance corresponding to K cos $\theta_1$, which is equal to $X_1$, a known value. Since the value of X is equal to K cos $\theta$, the setting of pointer 106 to the value of $X_1$, on dial 112 sets the ball carrier 58 to the initial condition of K cos $\theta$, or cos $\theta_1$, through shaft 20, gears 88, 84, shaft 24, gear 86, and rack 62 connected to ball carrier 58. The knob 102 is also manually rotated in the proper direction in relation to dial 114 a distance corresponding to K sin $\theta_1$, which is equal to $Y_1$, a known value, and since the value of Y is equal to K sin $\theta$, the setting of pointer 108 to the value of $Y_1$, on dial 114 sets the ball carrier 56 to the initial condition of K sin $\theta$, or K sin $\theta_1$, through shaft 22, gears 96 and 92, shaft 26, gear 94, and rack 60 connected to ball carrier 56.

In the illustrated embodiment, during initial adjustment of the inputs 100 and 102 as above described, the discs 48 and 50 should be held against rotation so that the cylinders 52 and 54 slip with respect to their ball carriers.

Bearing in mind the fact that ball, disc and cylinder integrators, such as 44 and 46, are effective to provide the integral of a function, represented by the degree of rotation of the cylinder element, when the disc element is rotated an amount equivalent to the rate of change of the function, and when the ball carrier is moved radially of the disc a distance representing the difference between the initial condition and the final condition of the function, and remembering that the ball carriers 56 and 58 have been set, respectively, to the initial conditions of the functions K sin $\theta$ and K cos $\theta$, it will be apparent that the rotation of knob 104 and pointer 110 in relation to disc 116 and for the distance equivalent to $\theta_2-\theta_1$, or $d\theta$, will cause shaft 28, disc 48, gears 38 and 40, shaft 42 and disc 50 to rotate an amount equivalent to $d\theta$. The rotation of discs 48 and 50 imparts a movement to the balls 64 and 68, respectively, and the movement of balls 64 and 68 imparts a rotative movement to cylinders 52 and 54. The total rotative movement, or output, of cylinder 52 is equal to the change in $x$ or $dx$ and equals $$K\int_{\theta_2}^{\theta_1} \sin\theta d\theta$$

which in turn equals $$-K \cos \theta\Big|_{\theta_2}^{\theta_1}$$

Thus, $X_2-X_1=-K\cos\theta_1+K\cos\theta_2$, and this value is imparted by rotation of cylinder 52 to shaft 72, gear 76 and gear 80 to shaft 24. Shaft 24 adds this value to ball carrier 58 through gear 86 and rack 62, so that the ball carrier is moved a distance equivalent to the difference between the initial condition and the final condition of K cos $\theta$, and shaft 24 further adds this value to dial 112 through gears 84 and 88, shaft 20, knob 100 and pointer 106 to add $X_2-X_1$ or $K\cos\theta_2-K\cos\theta_1$ to $X_1$, or K cos $\theta_1$, with the result that pointer 106 indicates the value of $X_2$ or K cos $\theta_2$.

In the same manner that ball carrier 58 was moved to the final condition of K cos $\theta$ by the output of cylinder 52, ball carrier 56 was moved to the final condition of K sin $\theta$ by the output of cylinder 54 which is equal to the change in Y or $dy$, which in turn is equal to $$K\int_{\theta_1}^{\theta_2} \cos\theta d\theta$$

or $$K \sin \theta\Big|_{\theta_1}^{\theta_2}$$

Thus $Y_2-Y_1=K\sin\theta_2-K\sin\theta_1$, which value was fed back to ball carrier 56 through shaft 74, gears 78 and 82, shaft 26, gear 94 and rack 60, and to dial 114 through shaft 26, gears 92 and 96, shaft 22, knob 102, and pointer 108. The value $Y_2-Y_1$, or $K\sin\theta_2-K\sin\theta_1$, is thus added to $Y_1$, or K sin $\theta_1$, the initial setting of pointer 108, to give $Y_2=K\sin\theta_2$.

Thus, the value of $X_2$ and $Y_2$ are directly readable from dials 112 and 114. In like manner the values of X and Y, regardless of the change in $\theta$, can be maintained on dials 112 and 114 by keeping the pointer 110 set to the new value of $\theta$, assuming that the three pointers 106, 108 and 110 were initially set to the respective values corresponding to the condition when $\theta=0°$. The first setting of the dials 112 and 114 enter the value of K into the system and this value, as was previously noted, does not vary with a change in the values of $x$, $y$ and $\theta$.

FIGURE 7 illustrates another problem which may be solved by the computer of the invention. In this problem there is given a right triangle having a hypotenuse $r$ of known value and an angle $\theta$ of known value, and it is desired that the values of the sides $x$ and $y$ of the triangle be determined. $x$ and $y$ are equal, respectively to $r\cos\theta$ and $r\sin\theta$. To solve the problem, the pointer 106 is turned to $r$, the condition of $x$ when $\theta$ equals zero, and the pointer 108 is left at zero, the condition of $y$ when $\theta$ equals zero. This sets the ball carrier 58 at the condition $r\cos\theta$ when $\theta$ equals zero, and leaves the carrier 56 at the center of disc 48, which position represents the condition of $r\sin\theta$ when $\theta$ equals zero. Shaft 28 is then rotated so that pointer 110 moves from 0 to the angular value representative of $\theta$, thus causing discs 48 and 50 to rotate and impart outputs to cylinders 52 and 54, respectively, of $$-r \cos \theta\Big|_{\theta=\theta}^{\theta=0}$$

which is equal to $x-x_\theta=\theta$, and $$r \sin \theta\Big|_{\theta=0}^{\theta=\theta}$$

which is equal to $y-y\theta=0$. The values $x-x\theta=0$ or $r\cos\theta-r$, *and* $y-y\theta=0$, or $r\sin\theta$, are fed back through shafts 20 and 22, respectively, to change the reading on dial 112 from $r$ to $r \cos \theta$, the value of $x$, and to change the reading on dial 114 from zero to $r \sin \theta$, the value of Y. The values of $x$ and $y$ are then directly readable from the dials 112 and 114.

Reference is again had to FIGURE 7 for a demonstration of another problem which may be solved by the computer of the invention. Instead of $r$ and $\theta$ being known, and $x$ and $y$ being unknown, as in the foregoing problem, here $x$ and $y$ are known and it is desired that $r$ and $\theta$ be read directly from the computer dials. To solve the problem, the numerical values of $x$ and $y$, representing the initial conditions, respectively, of $r \cos \theta$ and $r \sin \theta$ are fed to the ball carriers 58 and 56; pointer 110 is rotated from a zero setting to a position where one of the pointers 106 or 108 is at a zero setting; and the value of $\theta$ is then indicated by pointer 110, while the value of $r$ is indicated by the pointer, 106 or 108, which has not been returned to a zero setting. Assuming that the pointer 108 is the one that will be returned to zero by an input of the change in $\theta$, this means that the final condition of $y$, or the final condition of $r \sin \theta$, is equal to zero, which in turn means that the final condition of $\theta$ is zero. When the final condition of $\theta$ is zero, $x$ being equal to $r \cos \theta$, equals $r$, which is the hypotenuse of the triangle, and the value of $r$ is directly readable on dial 112. Also, since pointer 110 has been moved through the change of $\theta$, and since the final condition of $\theta$ is zero, the pointer 110 will indicate the value of $\theta$ directly.

Figure 2:
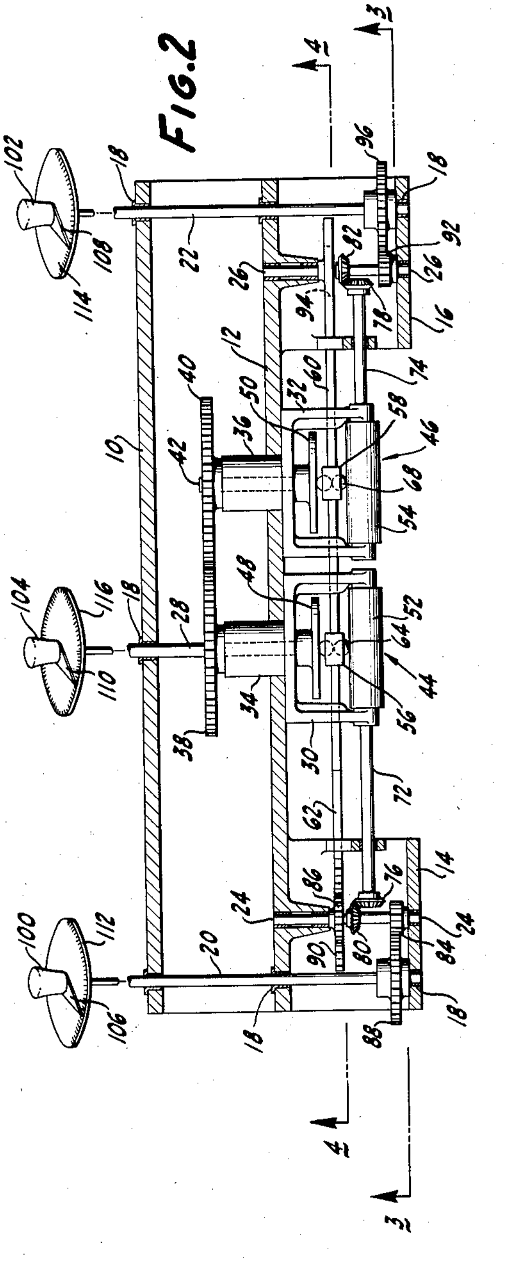
FIGURE 2 is a view in front elevation of the computer, with the supporting structure shown in section and with the input and output controls shown in perspective.
Figure 3:
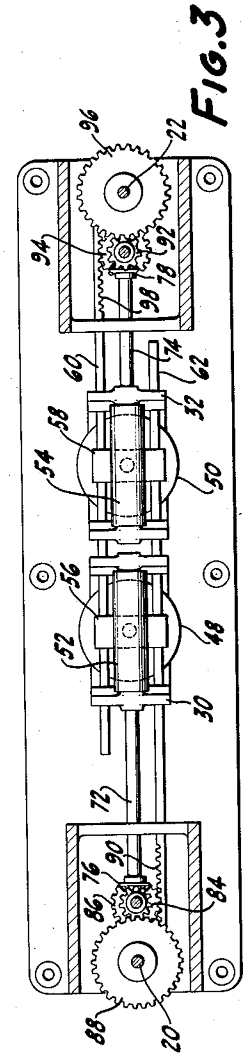
FIGURE 3 is a view in section of the computer taken along lines 3—3 of FIGURE 2.
Figure 4:
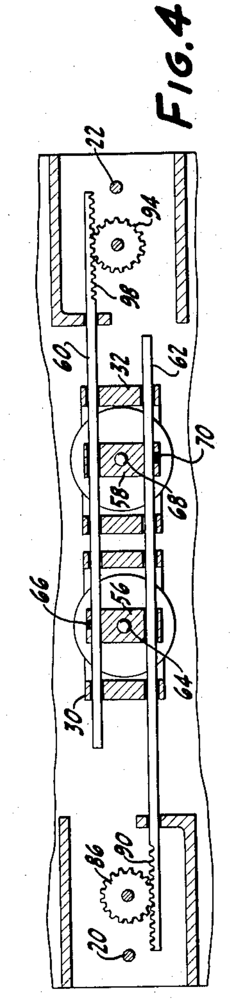
FIGURE 4 is a view in section of the computer taken along lines 4—4 of FIGURE 2.

It will be especially noted that when the ball carriers are located centrally of the discs 48 and 50, as shown in FIGURE 2, the gears 86 and 94 are in engagement with the intermediate teeth of racks 62 and 60. Thus the ball carriers may be moved an equal distance either way from the center of discs 48 and 50 by the racks so as to enable the setting of the carriers through a full range of negative as well as positive input and output values.

The instant application is a division of my copending application entitled, Anti-Submarine Attack Director, Serial Number 627,587, filed November 9, 1945. In the parent application, the computer of the present invention is best shown in FIGURE 40 and described as the target speed component resolver of the Anti-Submarine Attack Director. The computer, however, has basic utility as a separate entity and in other combinations in the solving of particular types of problems, as appears from the examples of problems hereinbefore set forth.

While the preferred embodiment of the invention has been shown and described, it is to be understood that the structure shown is subject to modification within the spirit of the invention and the scope of the appended claims.

What I claim as new and desire to secure by Letters Patent is:

1. A computer comprising first and second integrating devices each having input means, output means, and adjustable means for varying the relation of the rate of operation of said output means to the rate of operation of said input means; the combination of means controlled by the output means of said first integrating device for adjusting the said adjustable means of said second integrating device an amount directly proportional to the magnitude of movement of the output means of said first integrating device and means controlled by the output means of said second integrating device for adjusting the said adjustable means of said first integrating device an amount directly proportional to the magnitude of movement of the output means of said second integrating device.

2. A computer comprising first and second mechanisms each having input and output members and a variably positionable driving member connected therebetween to operate its output member in accordance with a trignometric function of the movement of its input member; a first input variably positioning the driving member of one of said mechanisms, a second input variably positioning the driving member of another of said mechanisms, a third input connected to drive the input members of both of said mechanisms, a driving connection between the output member of said one mechanism and said second input operable to adjust said second input an amount directly proportional to the magnitude of movement of the output of said first mechanism and a driving connection between the output member of said another of said mechanisms and said first input operable to adjust said first input an amount directly proportional to the magnitude of movement of the output member of said second mechanism.

3. A computer comprising a first integrator means and a second integrator means, each having a movable input and a movable output and each having a driving connection therebetween variably positionable, a first input means connected to the driving connection of said first integrator means and adapted to position said driving connection in accordance with the function of a value introduced into said first input means, a second input means connected to the driving connection of said second integrator means and adapted to position said driving connection in accordance with the function of a value introduced into said second input means, a third input means drivably connected to the inputs of said integrator means and adapted to move said inputs in proportion to a third value, said first and second values being functions of said third value, to integrate said first and second values between the initial and final conditions of said third value and move the outputs of said integrator means in proportion to said integrated values, means forming a driving connection between the output of said first integrator means and an element of said second input means operable to adjust said second input means an amount directly proportional to the magnitude of movement of said output of said first integrator means, and means forming a driving connection between the output of said second integrator means and an element of said first input means operable to adjust said first input means an amount directly proportional to the magnitude of movement of said output of said second integrator means.

4. A computer comprising first and second integrators each having a disc, a cylinder and a ball carrier having a pair of contacting balls forming a driving connection between said disc and cylinder, a first input means connected to the ball carrier of said first integrator and adapted to position said carrier radially of its associated disc, a second input means connected to the ball carrier of said second integrator and adapted to position said carrier radially of its associated disc, a third input means drivably connected to said discs, means interconnecting the cylinder of said first integrator with an element of said second input means operable to adjust the ball carrier of said second integrator an amount directly proportional to the magnitude of the rotation of the cylinder of said first integrator, and means interconnecting the cylinder of said second integrator with an element of said first input means operable to adjust the ball carrier of said first integrator an amount directly proportional to the magnitude of the rotation of the cylinder of said second integrator.

5. A computer comprising two integrators, each having a driving disc, a driven cylinder and a holder housing two contacting balls, one of which contacts the disc and the other of which contacts the cylinder, means to rotate the disc of each integrator, positioning means whereby the holder of the first integrator may be moved radially toward or away from the center of its disc to vary the amount its cylinder will be driven, positioning means whereby the holder of the second integrator may be moved radially toward or away from the center of its disc to vary the amount its cylinder will be driven, and means whereby the cylinder of each of the integrators is connected to a part of the positioning means of the other integrator; said means being effective to move each of said positioning means an amount directly proportional to the magnitude of the rotation of the cylinder connected thereto.

6. A computer comprising two integrators, each having a driving disc, a driven cylinder and a holder housing two contacting balls, one of which contacts the disc and the other of which contacts the cylinder, a common means to rotate the discs of each integrator equally, positioning means whereby the holder of the first integrator may be moved radially toward or away from the center of its disc to vary the amount its cylinder will be driven, positioning means whereby the holder of the second integrator may be moved radially toward or away from the center of its disc to vary the amount its cylinder will be driven, and means whereby the cylinder of each of the integrators is connected to a part of the positioning means of the other integrator; said means being effective to move each of said positioning means an amount directly proportional to the magnitude of the rotation of the cylinder connected thereto.

7. In a computer comprising first and second integrating devices each having input means, output means and adjustable means for varying the relation of the rate of operation of said output means to the rate of operation of said input means; the combination of means controlled solely by the output means of said first integrating device for adjusting the said adjustable means of said second integrating device, and means controlled solely by the output means of said second integrating device for adjusting the said adjustable means of said first integrating device.

8. A computer comprising first and second mechanisms each having input and output members and a variably positionable driving member connected therebetween to operate its output member in accordance with a trignometric function of the movement of its input member; a first input variably positioning the driving member of one of said mechanisms, a second input variably positioning the driving member of another of said mechanisms, a third input connected to drive the input members of both of said mechanisms, a driving connection exclusively between the output member of said one mechanism and said second input, and a driving connection exclusively between the output member of said another of said mechanisms and said first input.

References Cited in the file of this patent

UNITED STATES PATENTS

| | | |
|---|---|---|
| 2,206,875 | Chafee et al. | July 9, 1940 |
| 2,442,792 | White et al. | June 8, 1948 |
| 2,540,989 | Newell | Feb. 6, 1951 |